(12) United States Patent
Liang (10) Patent No.: US 9,019,627 B2
(45) Date of Patent: Apr. 28, 2015

(54) LENS ASSEMBLY

(71) Applicants: Sintai Optical (Shenzhen) Co., Ltd., Shenzhen, Guandong Province (CN); Asia Optical International Ltd., Tortola (GB)

(72) Inventor: Yuan-Fan Liang, Taichung (TW)

(73) Assignees: Sintai Optical (Shenzhen) Co., Ltd., Shenzhen, Guandong Province (CN); Asia Optical International Ltd., Tortola (VG)

(*) Notice: Subject to any disclaimer, the term of this patent is extended or adjusted under 35 U.S.C. 154(b) by 0 days.

(21) Appl. No.: 14/038,797

(22) Filed: Sep. 27, 2013

(65) Prior Publication Data
US 2014/0092488 A1 Apr. 3, 2014

(30) Foreign Application Priority Data
Oct. 1, 2012 (TW) .............................. 101136164 A (51) Int. Cl.
*G02B 13/00* (2006.01)

(52) U.S. Cl.
CPC ........ *G02B 13/0045* (2013.01); *G02B 13/0015* (2013.01)

(58) Field of Classification Search
CPC . G02B 13/0015; G02B 13/0045; G02B 13/18
USPC .......................................... 359/714, 763, 764
See application file for complete search history.

(56) References Cited

U.S. PATENT DOCUMENTS

2011/0164327 A1* 7/2011 Sato .............................. 359/714

* cited by examiner

*Primary Examiner* — David N Spector
(74) *Attorney, Agent, or Firm* — McClure, Qualey & Rodack, LLP (57) ABSTRACT

A lens assembly includes a first lens, a second lens, a third lens, a fourth lens and a fifth lens, all of which are arranged in sequence from an object side to an image side along an optical axis. The first lens is with positive refractive power and includes a convex surface facing the object side. The second lens is a meniscus lens with negative refractive power and includes a convex surface facing the object side. The third lens is with positive refractive power and includes a convex surface facing the image side. The fourth lens is with positive refractive power and includes a convex surface facing the image side. The fifth lens is a biconcave lens with negative refractive power.

21 Claims, 6 Drawing Sheets

LENS ASSEMBLY

BACKGROUND OF THE INVENTION

1. Field of the Invention

The invention relates to a lens assembly.

2. Description of the Related Art

Generally, in a digital still camera with lower pixel number, only one or two lenses are included that is sufficient to meet the quality requirement of image resolution. In a digital still camera with more than 2 megapixels, at least four lenses are included to satisfy quality requirement of image resolution. In recent years, people's requirements for digital still cameras with large pixel number have been greatly increased. The well-known lens assembly with four lenses cannot meet the requirement of the present, and a digital still camera with 8 megapixels and above has gradually become the mainstream market. Meanwhile, however, the development of miniaturization and lightweight for digital still cameras and mobile phones leads to large number requirements of miniaturized lens assemblies. Therefore, a new lens assembly of large pixel number, miniaturization and lightweight is required.

BRIEF SUMMARY OF THE INVENTION

The invention provides a lens assembly to solve the above problems. The lens assembly is compact, lightweight, and provided with a smaller F-number and a shortened total track, and still has good optical performance.

The lens assembly in accordance with an exemplary embodiment of the invention includes a first lens, a second lens, a third lens, a fourth lens and a fifth lens, all of which are arranged in sequence from an object side to an image side along an optical axis.

The first lens is with positive refractive power and includes a convex surface facing the object side. The second lens is a meniscus lens with negative refractive power and includes a convex surface facing the object side. The third lens is with positive refractive power and includes a convex surface facing the image side. The fourth lens is with positive refractive power and includes a convex surface facing the image side. The fifth lens is a biconcave lens with negative refractive power.

In another exemplary embodiment, the lens assembly satisfies the following conditions:

$D_{bf}/D > 0.22$ $0.55 < ImaH/D < 0.75$ $f/D_{34} > 45$ $0.8 < D_{56}/D_{78} < 1.2$ $5 < f/D_{910} < 20$ $|f_1/f| > 0.7$ $|f_3/f_4| < 8$ wherein $D_{bf}$ is the back focal length of the lens assembly, D is the distance from the convex surface of the first lens to the image plane along the optical axis, ImaH is the half of image high, f is the effective focal length of the lens assembly, $D_{34}$ is the distance from the surface of the first lens facing the image side to the convex surface of the second lens, $D_{56}$ is the distance from the surface of the second lens facing the image side to the surface of the third lens facing the object side, $D_{78}$ is the distance from the convex surface of the third lens to the surface of the fourth lens facing the object side, $D_{910}$ is the distance from the convex surface of the fourth lens to the surface of the fifth lens facing the object side, $f_1$ is the effective focal length of the first lens, $f_3$ is the effective focal length of the third lens and $f_4$ is the effective focal length of the fourth lens.

In yet another exemplary embodiment, the first lens is made of plastic material or glass material.

In another exemplary embodiment, the second lens is made of plastic material or glass material.

In yet another exemplary embodiment, the third lens is made of plastic material or glass material.

In another exemplary embodiment, the fourth lens is made of plastic material or glass material.

In yet another exemplary embodiment, the fifth lens is made of plastic material or glass material.

In another exemplary embodiment, the first lens further includes a surface, and the surface or the convex surface or both are aspheric surfaces.

In yet another exemplary embodiment, the second lens further includes a surface, and the surface or the convex surface or both are aspheric surfaces.

In another exemplary embodiment, the third lens further includes a surface, and the surface or the convex surface or both are aspheric surfaces.

In yet another exemplary embodiment, the fourth lens further includes a surface, and the surface or the convex surface or both are aspheric surfaces.

In another exemplary embodiment, the fifth lens includes two convex surfaces, at least one of which is an aspheric surface.

In yet another exemplary embodiment, the third lens includes the central part and the edge, the central part is flatter than the edge and the thickness variation of the central part is less than that of the edge.

In another exemplary embodiment, the fifth lens includes two surfaces, at least one of which is an inflecting surface.

In yet another exemplary embodiment, the lens assembly future includes an optical filter disposed between the fifth lens and the image side.

In another exemplary embodiment, the lens assembly future includes a stop disposed between the object side and the first lens.

A detailed description is given in the following embodiments with reference to the accompanying drawings.

BRIEF DESCRIPTION OF THE DRAWINGS

The invention can be more fully understood by reading the subsequent detailed description and example with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
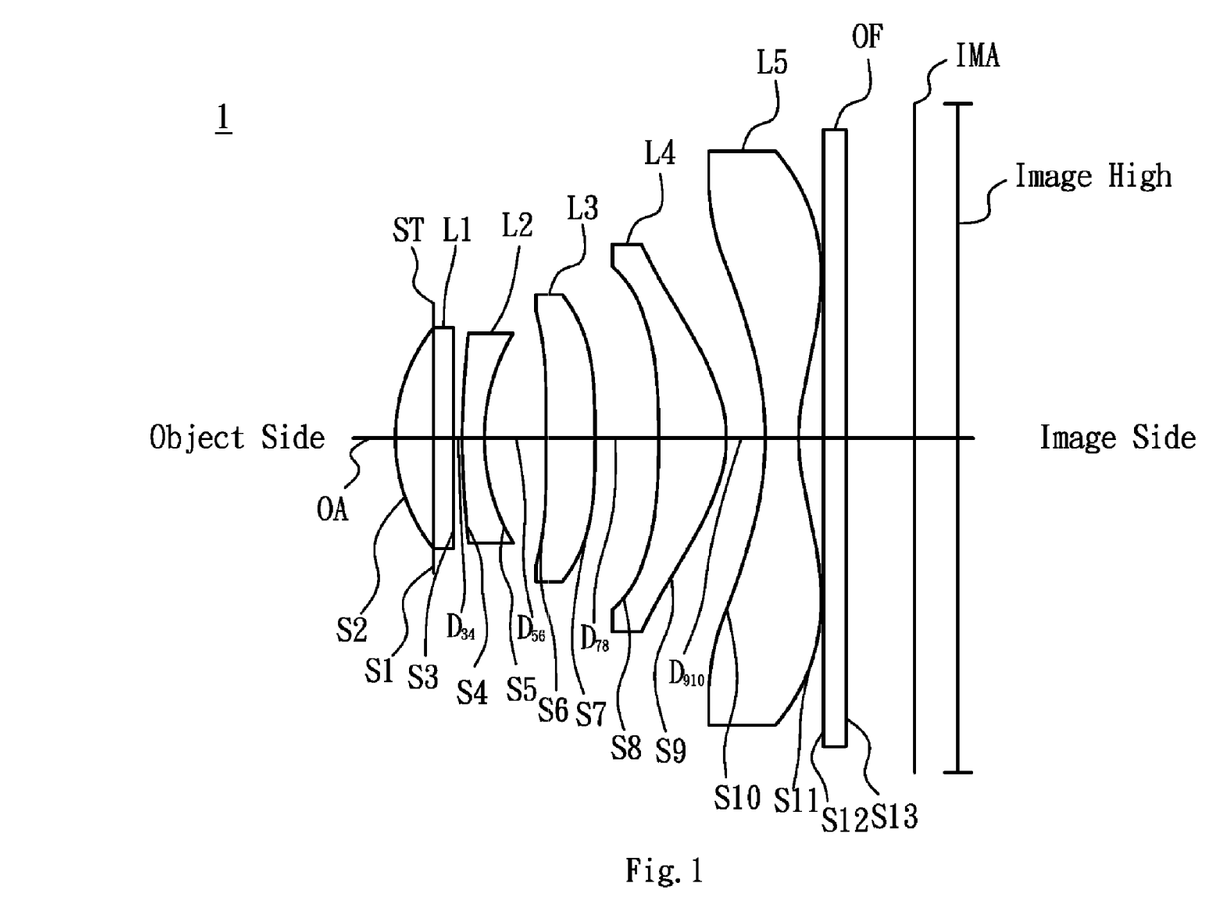
FIG. 1 is a lens layout diagram of a lens assembly in accordance with an embodiment of the invention.

Referring to FIG. 1, FIG. 1 is a lens layout diagram of a lens assembly in accordance with an embodiment of the invention. The lens assembly 1 includes a stop ST, a first lens L1, a second lens L2, a third lens L3, a fourth lens L4, a fifth lens L5 and a optical filter OF, all of which are arranged in sequence from an object side to an image side along an optical axis OA. The stop ST is disposed between the object side and the first lens L1. In the present embodiment, the first lens L1 is made of plastic material. The first lens L1 is with positive refractive power. Both of the surfaces S2, S3 are aspheric surfaces. The surface S2 is a convex surface facing the object side. The second lens L2 is made of plastic material. The second lens L2 is a meniscus lens with negative refractive power. Both of the surfaces S4, S5 are aspheric surfaces. The surface S4 is a convex surface facing the object side. The third lens L3 is made of plastic material. The third lens L3 is with positive refractive power. Both of the surfaces S6, S7 are aspheric surfaces. The surface S7 is a convex surface facing the image side. The central area of the third lens L3 is flat and with small thickness variation. The edge of the third lens L3 is curved and with large thickness variation that can correct marginal ray so as to increase resolution of the edge image. The fourth lens L4 is made of plastic material. The fourth lens L4 is with positive refractive power. Both of the surfaces S8, S9 are aspheric surfaces. The surface S9 is a convex surface facing the image side. The shape of the fourth lens L4 can reduce chief ray angle of the lens assembly 1 and increases resolution of the edge image. The fifth lens L5 is made of plastic material. Both of the concave surfaces S10, S11 are aspheric surfaces and inflecting surfaces. The optical filter OF is made of glass material. Both of the surfaces S12, S13 are plane surfaces.

In addition, in order to maintain excellent optical performance of the lens assembly 1, the lens assembly 1 must satisfies the following seven conditions:

$$D_{bf}/D > 0.22 \quad (1)$$

$$0.55 < ImaH/D < 0.75 \quad (2)$$

$$f/D_{34} > 45 \quad (3)$$

$$0.8 < D_{56}/D_{78} < 1.2 \quad (4)$$

$$5 < f/D_{910} < 20 \quad (5)$$

$$|f_1/f| > 0.7 \quad (6)$$

$$|f_3/f_4| < 8 \quad (7)$$

wherein $D_{bf}$ is the back focal length of the lens assembly 1, D is the distance from the convex surface S2 of the first lens L1 to the image plane IMA along the optical axis OA, ImaH is the half of image high, f is the effective focal length of the lens assembly 1, $D_{34}$ is the distance from the surface S3 of the first lens L1 facing the image side to the convex surface S4 of the second lens L2, $D_{56}$ is the distance from the surface S5 of the second lens L2 facing the image side to the surface S6 of the third lens L3 facing the object side, $D_{78}$ is the distance from the convex surface S7 of the third lens L3 to the surface S8 of the fourth lens L4 facing the object side, $D_{910}$ is the distance from the convex surface S9 of the fourth lens L4 to the surface S10 of the fifth lens L5 facing the object side, $f_1$ is the effective focal length of the first lens L1, $f_3$ is the effective focal length of the third lens L3 and $f_4$ is the effective focal length of the fourth lens L4.

Due to the above design of the lenses and stop ST and use of plastic lenses, the lens assembly 1 which is compact, light-weight, and provided with a smaller F-number and a shortened total track, still has good optical performance.

In order to achieve the above purpose and effectively enhance the optical performance, the lens assembly 1 of the present embodiment of the invention is provided with the optical specifications shown in Table 1, which include the effective focal length, F-number, field of view, total track, radius of curvature of each lens surface, interval between adjacent surface, refractive index of each lens and Abbe number of each lens. Table 1 shows that the effective focal length=3.7882 mm, F-number=2.0, field of view=73.45° and total track=4.5999 mm for the lens assembly 1 of the present embodiment of the invention.

TABLE 1

Effective Focal Length = 3.7882 mm F-number = 2.0
Field of View = 73.45° Total Track = 4.5999 mm

| Surface Number | Radius of Curvature (mm) | Thickness (mm) | Nd | Vd | Remark |
| --- | --- | --- | --- | --- | --- |
| S1 | ∞ | −0.3145444 | | | Stop ST |
| S2 | 1.576389 | 0.5060648 | 1.5441 | 56.0936 | The First Lens L1 |
| S3 | −19.23017 | 0.08299641 | | | Interval $D_{34}$ |
| S4 | 5.684401 | 0.2 | 1.6355 | 23.8914 | The Second Lens L2 |
| S5 | 1.732757 | 0.5446903 | | | Interval $D_{56}$ |
| S6 | 61.64659 | 0.4338082 | 1.5441 | 56.0936 | The Third Lens L3 |
| S7 | −10.83543 | 0.5638359 | | | Interval $D_{78}$ |
| S8 | −9.246462 | 0.5977102 | 1.5441 | 56.0936 | The Fourth Lens L4 |
| S9 | −1.07823 | 0.3426267 | | | Interval $D_{910}$ |
| S10 | −2.98641 | 0.3 | 1.5441 | 56.0936 | The Fifth Lens L5 |
| S11 | 1.488291 | 0.22 | | | |
| S12 | ∞ | 0.2 | 1.5168 | 64.1673 | Optical Filter OF |
| S13 | ∞ | 0.60816269 | | | |

The aspheric surface sag z of each lens in table 1 can be calculated by the following formula:

$$z = \frac{ch^2}{1 + [1 - (k+1)c^2h^2]^{1/2}} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the present embodiment, the conic constant k and the aspheric coefficients A~G of each surface are shown in Table 2.

TABLE 2

| Surface Number | k | A | B | C | D | E | F | G |
|---|---|---|---|---|---|---|---|---|
| S2 | 0.08592385 | 0.000828 | 0.027814 | −0.04349 | 0.042159 | 0.027193 | −0.05462 | 0.020833 |
| S3 | 0 | 0.065159 | −0.04025 | 0.045417 | −0.02977 | −0.00524 | 0 | 0 |
| S4 | 0 | −0.03236 | 0.059999 | −0.04594 | −0.0242 | 0.005705 | −0.00335 | 0 |
| S5 | −0.1483306 | −0.07041 | 0.134261 | −0.06603 | −0.01376 | 0.041003 | −0.01415 | 0.010503 |
| S6 | 0 | −0.08603 | 0.004121 | −0.00301 | −0.00928 | 0.014164 | 0.001061 | 0 |
| S7 | 57.92265 | −0.08254 | −0.00423 | 0.004404 | −0.01452 | 0.006681 | 0.000203 | 0.000558 |
| S8 | 34.81803 | −0.07029 | 0.029421 | −0.01076 | −0.00014 | 0.000342 | 3.07E−05 | 0 |
| S9 | −3.732322 | −0.07798 | 0.038966 | −0.00271 | −0.00127 | 0.000157 | 0 | 0 |
| S10 | −0.8002928 | −0.00639 | 0.005213 | 0.000367 | −0.00013 | −4.58E−06 | 1.39E−06 | 0 |
| S11 | −10.8696 | −0.04498 | 0.010501 | −0.00218 | 0.000206 | −6.00E−06 | 3.01E−08 | 4.54E−09 |

For the lens assembly 1 of the present embodiment, the back focal length $D_{bf}$ equals to 1.02816 mm, the distance D from the convex surface S2 of the first lens L1 to the image plane IMA along the optical axis OA equals to 4.5999 mm, the half of image high ImaH equals to 2.8560 mm, the effective focal length f of the lens assembly 1 equals to 3.7882 mm, the distance $D_{34}$ from the surface S3 of the first lens L1 facing the image side to the convex surface S4 of the second lens L2 equals to 0.0830 mm, the distance $D_{56}$ from the surface S5 of the second lens L2 facing the image side to the surface S6 of the third lens L3 facing the object side equals to 0.5447 mm, the distance $D_{78}$ from the convex surface S7 of the third lens L3 to the surface S8 of the fourth lens L4 facing the object side equals to 0.5638 mm, the distance $D_{910}$ from the convex surface S9 of the fourth lens L4 to the surface S10 of the fifth lens L5 facing the object side equals to 0.3426 mm, the effective focal length $f_1$ of the first lens L1 equals to 2.6918 mm, the effective focal length $f_3$ of the third lens L3 equals to 16.9161 mm, and the effective focal length $f_4$ of the fourth lens L4 equals to 2.1794 mm. According to the above data, the following values can be obtained:

$$D_{bf}/D=0.2235,$$

$$ImaH/D=0.6209,$$

$$f/D_{34}=45.6410,$$

$$D_{56}/D_{78}=0.9661,$$

$$f/D_{910}=11.0572,$$

$$|f_1/f|=0.7106,$$

$$|f_3/f_4|=7.7618,$$

which respectively satisfy the above conditions (1)-(7).

Figure 2:
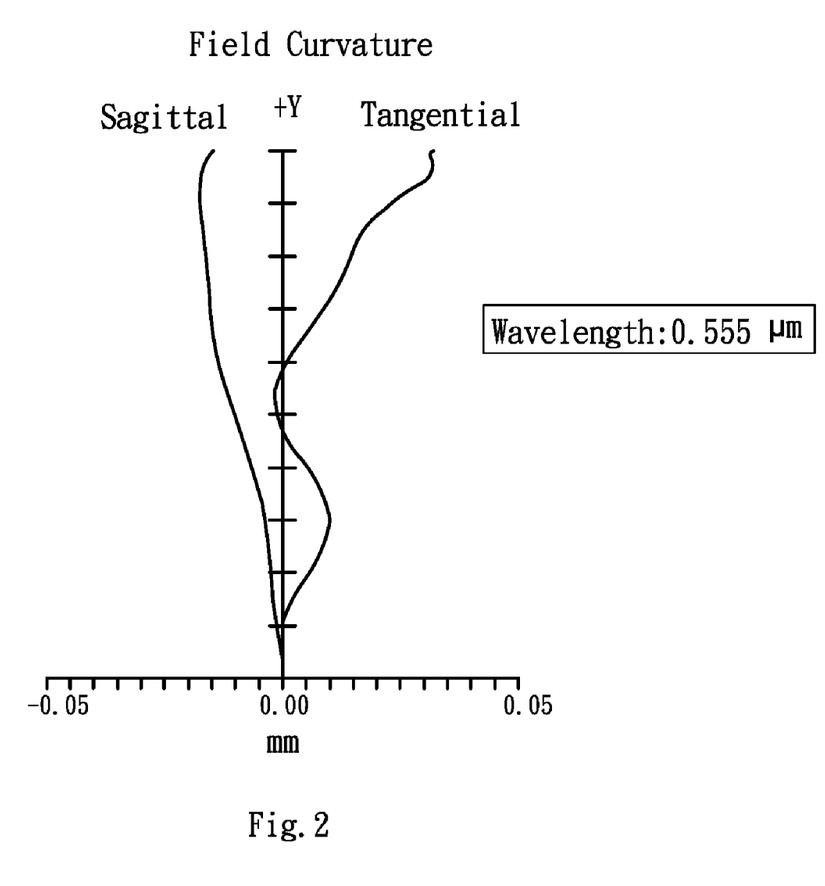
FIG. 2 is a field curvature diagram of a lens assembly in accordance with an embodiment of the invention.
Figure 3:
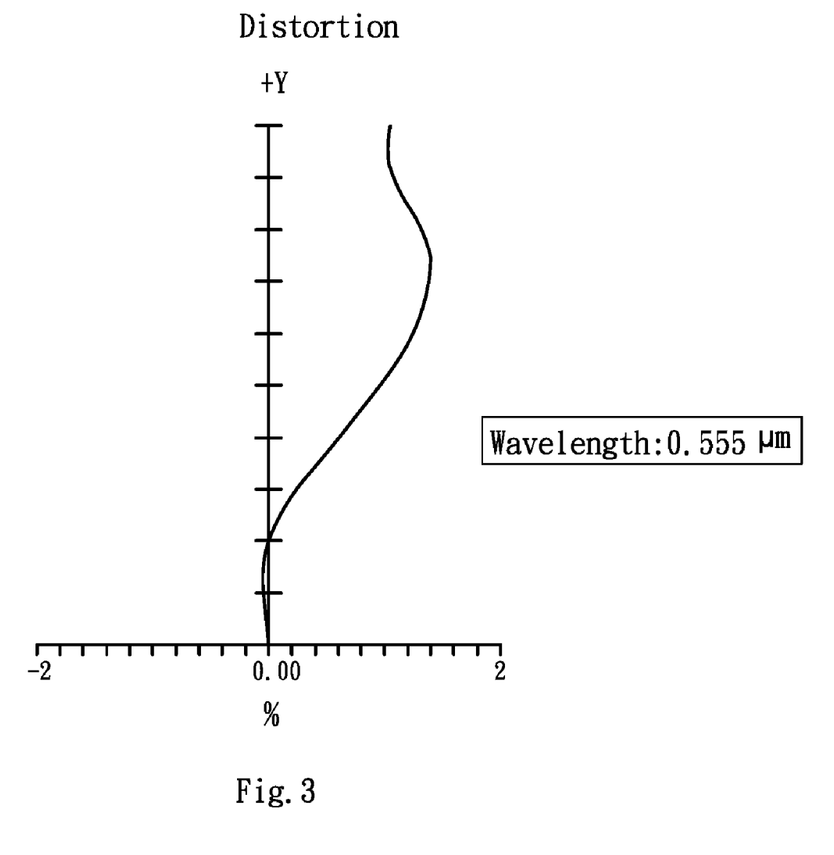
FIG. 3 is a distortion diagram of a lens assembly in accordance with an embodiment of the invention.
Figure 4:
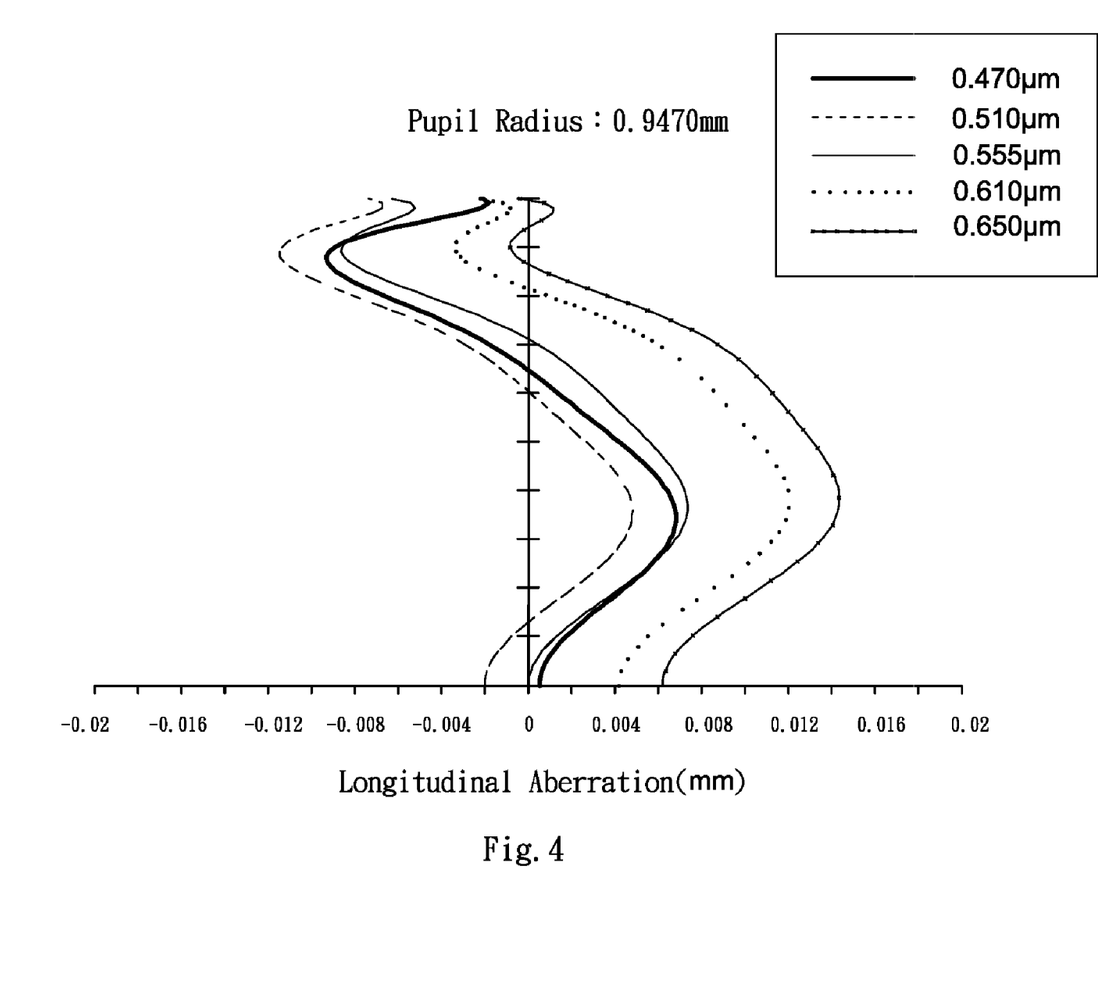
FIG. 4 is a longitudinal aberration diagram of a lens assembly in accordance with an embodiment of the invention.
Figure 5:
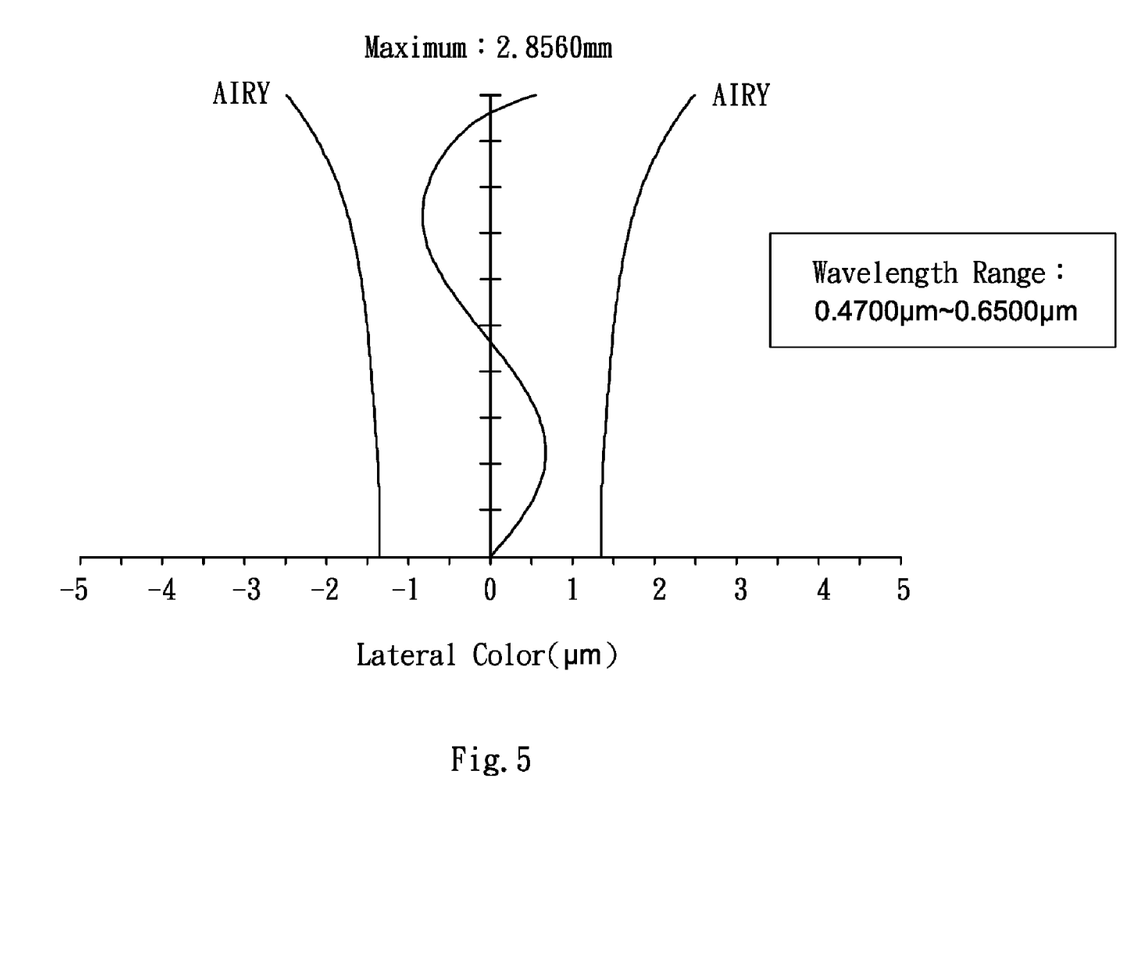
FIG. 5 is a lateral color diagram of a lens assembly in accordance with an embodiment of the invention.
Figure 6:
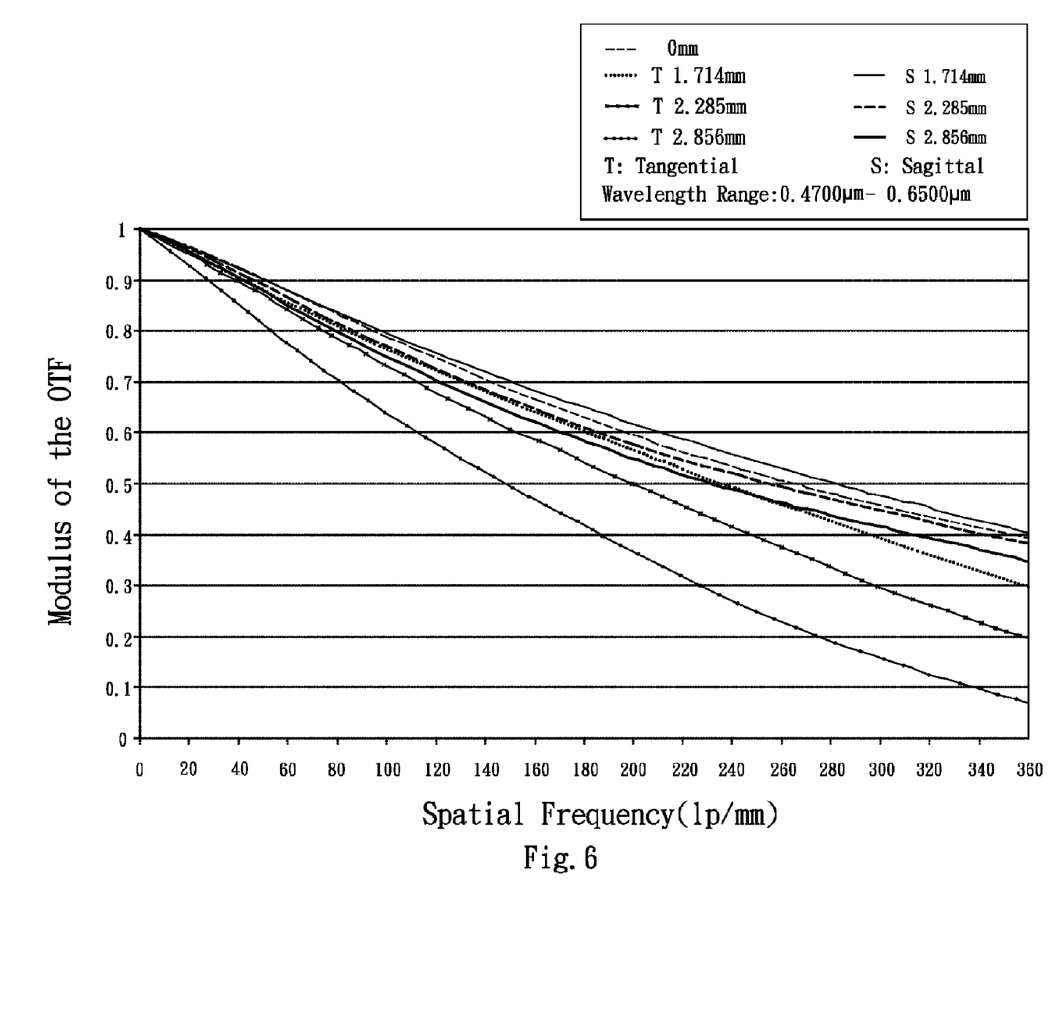
FIG. 6 is a modulation transfer function diagram of a lens assembly in accordance with an embodiment of the invention.

By the above arrangements of the lenses and stop ST, the lens assembly 1 of the present embodiment can meet the requirements of optical performance as seen in FIGS. 2-6, wherein FIG. 2 shows the field curvature diagram of the lens assembly 1 of the present embodiment, FIG. 3 shows the distortion diagram of the lens assembly 1 of the present embodiment, FIG. 4 shows the longitudinal aberration diagram of the lens assembly 1 of the present embodiment, FIG. 5 shows the lateral color diagram of the lens assembly 1 of the present embodiment, and FIG. 6 shows the modulation transfer function diagram of the lens assembly 1 of the present embodiment.

It can be seen from FIG. 2 that the field curvature of tangential direction and sagittal direction in the present embodiment ranges between −0.002 mm and 0.035 mm for the wavelength of 0.555 µm. It can be seen from FIG. 3 that the distortion in the present embodiment does not exceed plus or minus 1.6% for the wavelength of 0.555 µm. It can be seen from FIG. 4 that the longitudinal aberration in the present embodiment ranges between −0.012 mm and 0.016 mm for the wavelength ranging between 0.470 µm and 0.650 µm. It can be seen from FIG. 5 that the lateral color of different fields in the present embodiment ranges between −1 µm and 1 µm for the wavelength ranging between 0.470 µm and 0.650 µm. It can be seen from FIG. 6 that the modulation transfer function of tangential direction and sagittal direction in the present embodiment ranges between 0.07 and 1.0 for the wavelength ranges between 0.470 µm and 0.650 µm, field ranges between 0 mm and 2.856 mm, spatial frequency ranges between 01 p/mm and 3601 p/mm. It is obvious that the field curvature, the distortion, the longitudinal aberration and the lateral color of the lens assembly 1 of the present embodiment can be corrected effectively, and the image resolution can meet the requirement, thereby capable of obtaining good optical performance.

In the above embodiment, the first lens L1, all of the second lens L2, the third lens L3, the fourth lens L4 and the fifth lens L5 are made of plastic material. However, it has the same effect and falls into the scope of the invention if the first lens L1, the second lens L2, the third lens L3, the fourth lens L4, and/or the fifth lens L5 is made of glass material.

In the above embodiment, two surfaces S2, S3 of the first lens L1, two surfaces S4, S5 of the second lens L2, two surfaces S6, S7 of the third lens L3, two surfaces S8, S9 of the fourth lens L4 and two surfaces S10, S11 of the fifth lens L5 are all aspheric surfaces. However, it has the same effect and falls into the scope of the invention if any of the first, second, third, fourth and fifth lens has only one aspheric surface.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens assembly comprising a first lens, a second lens, a third lens, a fourth lens and a fifth lens, all of which are arranged in sequence from an object side to an image side along an optical axis, wherein:
the first lens is with positive refractive power and comprises a convex surface facing the object side;
the second lens is a meniscus lens with negative refractive power and comprises a convex surface facing the object side;
the third lens is with positive refractive power and comprises a convex surface facing the image side;
the fourth lens is with positive refractive power and comprises a convex surface facing the image side;
the fifth lens comprises a paraxial region and is biconcave with negative refractive power in the paraxial region; and
the lens assembly satisfies:

$$0.8 < D_{56}/D_{78} < 1.2$$

wherein $D_{56}$ is a distance from a surface of the second lens facing the image side to a surface of the third lens facing the object side, and $D_{78}$ is a distance from the convex surface of the third lens to a surface of the fourth lens facing the object side.

2. The lens assembly as claimed in claim 1, wherein the lens assembly satisfies:

$$0.55 < ImaH/D < 0.75$$

wherein ImaH is a half of image high, and D is a distance from the convex surface of the first lens to the image plane along the optical axis.

3. The lens assembly as claimed in claim 1, wherein the lens assembly satisfies:

$$f/D_{34} > 45$$

wherein f is an effective focal length of the lens assembly, and $D_{34}$ is a distance from an surface of the first lens facing the image side to the convex surface of the second lens.

4. The lens assembly as claimed in claim 1, wherein the lens assembly satisfies:

$$5 < f/D_{910} < 20$$

wherein f is an effective focal length of the lens assembly, and $D_{910}$ is a distance from the convex surface of the fourth lens to a surface of the fifth lens facing the object side.

5. The lens assembly as claimed in claim 1, wherein the first lens satisfies:

$$|f_1/f| > 0.7$$

wherein $f_1$ is an effective focal length of the first lens, and f is an effective focal length of the lens assembly.

6. The lens assembly as claimed in claim 1, wherein the third lens and the fourth lens satisfy:

$$|f_3/f_4| < 8$$

wherein $f_3$ is an effective focal length of the third lens, and $f_4$ is an effective focal length of the fourth lens.

7. The lens assembly as claimed in claim 1, wherein the first lens is made of plastic or glass material.

8. The lens assembly as claimed in claim 1, wherein the second lens is made of plastic or glass material.

9. The lens assembly as claimed in claim 1, wherein the third lens is made of plastic or glass material.

10. The lens assembly as claimed in claim 1, wherein the fourth lens is made of plastic or glass material.

11. The lens assembly as claimed in claim 1, wherein the fifth lens is made of plastic or glass material.

12. The lens assembly as claimed in claim 1, wherein the first lens further comprises a surface, and the surface or the convex surface or both are aspheric surfaces.

13. The lens assembly as claimed in claim 1, wherein the second lens further comprises a surface, and the surface or the convex surface or both are aspheric surfaces.

14. The lens assembly as claimed in claim 1, wherein the third lens further comprises a surface, and the surface or the convex surface or both are aspheric surfaces.

15. The lens assembly as claimed in claim 1, wherein the fourth lens further comprises a surface, and the surface or the convex surface or both are aspheric surfaces.

16. The lens assembly as claimed in claim 1, wherein the third lens further comprises a central part and an edge, wherein the central part is in a paraxial region of the third lens and the edge is in a periphery region of the third lens, a curvature change of the central part is less than a curvature change of the edge and a thickness change of the central part is less than a thickness change of the edge.

17. The lens assembly as claimed in claim 1, wherein the fifth lens comprises two surfaces, at least one of which comprises an inflection point or both of which comprise inflection points.

18. The lens assembly as claimed in claim 1, further comprising an optical filter disposed between the fifth lens and the image side.

19. A lens assembly comprising a first lens, a second lens, a third lens, a fourth lens and a fifth lens, all of which are arranged in sequence from an object side to an image side along an optical axis, wherein:
the first lens is with positive refractive power and comprises a convex surface facing the object side;
the second lens is a meniscus lens with negative refractive power and comprises a convex surface facing the object side;
the third lens is with positive refractive power and comprises a convex surface facing the image side;
the fourth lens is with positive refractive power and comprises a convex surface facing the image side; and
the fifth lens is a biconcave lens with negative refractive power,
wherein the lens assembly satisfies:

$$D_{bf}/D > 0.22$$

wherein $D_{bf}$ is a back focal length of the lens assembly, and D is a distance from the convex surface of the first lens to the image plane along the optical axis.

20. A lens assembly comprising a first lens, a second lens, a third lens, a fourth lens and a fifth lens, all of which are arranged in sequence from an object side to an image side along an optical axis, wherein:
the first lens is with positive refractive power and comprises a convex surface facing the object side;
the second lens is a meniscus lens with negative refractive power and comprises a convex surface facing the object side;
the third lens is with positive refractive power and comprises a convex surface facing the image side;
the fourth lens is with positive refractive power and comprises a convex surface facing the image side; and
the fifth lens is a biconcave lens with negative refractive power, wherein the fifth lens comprises two concave surfaces, at least one of which is an aspheric surface.

21. A lens assembly comprising a stop, a first lens, a second lens, a third lens, a fourth lens and a fifth lens, all of which are arranged in sequence from an object side to an image side along an optical axis, wherein:

the first lens is with positive refractive power and comprises a convex surface facing the object side;
the second lens is a meniscus lens with negative refractive power and comprises a convex surface facing the object side;
the third lens is with positive refractive power and comprises a convex surface facing the image side;
the fourth lens is with positive refractive power and comprises a convex surface facing the image side;
the fifth lens is a biconcave lens with negative refractive power; and
the stop is disposed between the object side and the first lens.

* * * * *